United States Patent [19]
Aselman, Jr.

[11] Patent Number: 4,578,936
[45] Date of Patent: Apr. 1, 1986

[54] COTTON HARVESTER HARVESTING ROTOR SPEED MONITOR FREQUENCY INDICATOR

[75] Inventor: Edward C. Aselman, Jr., Beaver Creek, Ohio

[73] Assignee: J. I. Case Company, Racine, Wis.

[21] Appl. No.: 636,532

[22] Filed: Aug. 1, 1984

[51] Int. Cl.⁴ .............................................. A01D 46/08
[52] U.S. Cl. ........................................ 56/40; 56/10.2; 324/161; 340/671
[58] Field of Search ................. 56/28, 10.2, DIG. 15, 56/10.3, 12.4, 12.5, 33, 40, 41, 36; 324/161, 166; 340/671

[56] References Cited

U.S. PATENT DOCUMENTS

| | | | |
|---|---|---|---|
| 3,524,103 | 8/1970 | McCune | 324/161 |
| 3,599,154 | 8/1971 | Carol et al. | 324/161 |
| 3,739,367 | 6/1973 | Fathauer | 324/161 |
| 3,792,460 | 2/1974 | Ratz | 340/671 |
| 4,003,046 | 1/1977 | Jordan et al. | 324/161 |
| 4,007,492 | 2/1977 | Rose | 324/161 |
| 4,149,160 | 4/1979 | Bozarth et al. | 340/661 |

Primary Examiner—Robert P. Swiatek
Assistant Examiner—John G. Weiss
Attorney, Agent, or Firm—Dressler, Goldsmith, Shore, Sutker & Milnamow, Ltd.

[57] ABSTRACT

The present invention provides a method and system for monitoring the rotor speed of the harvesting rotors of a cotton harvester. The inventive rotor speed monitor determines the rotational speed of each individual rotor. The individual speeds of the rotors are combined and an average rotor speed computed. The individual rotor speed is then compared with the average speed for the combined rotors. An alarm is provided to alert the operator whenever the rotational speed of a given rotor differs by a predetermined amount from the average rotational speed for the combined rotors. The invention rotor speed monitor can provide an early indication of rotor malfunction and also detours false signals generated by the harvester rotors deceleration after completion of the harvesting operation on a cotton row.

3 Claims, 4 Drawing Figures

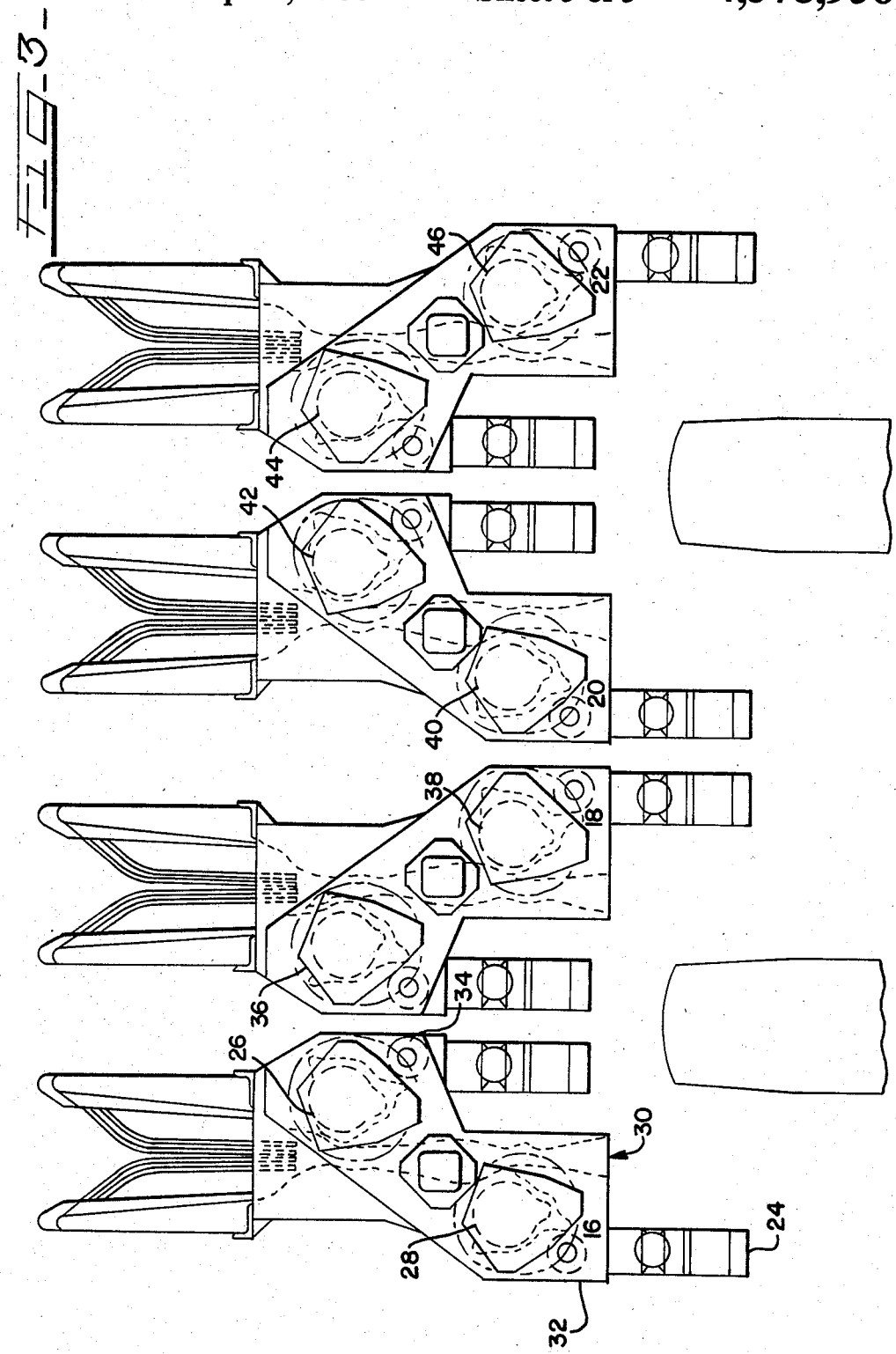

COTTON HARVESTER HARVESTING ROTOR SPEED MONITOR FREQUENCY INDICATOR

FIELD OF THE INVENTION

The field of the present invention is of cotton harvesters. More particularly the field of the present invention is for rotational speed monitors for the picker spindle rotors of a picker type cotton harvester and the stripper brush rolls of a stripper type row cotton harvester.

DISCLOSURE STATEMENT

Row cotton harvesting machines are of two basic types. One basic type of cotton harvester is a cotton stripper. Cotton strippers harvest the cotton by removing the total boll from the plant. Pivotally and forwardly mounted from the frame of the cotton stripper is a plurality of harvesting units or drums. Within each drum of the cotton stripper, there are two adjacent generally parallel mounted brush rolls which rotatably strike the cotton plant to remove the boll from the cotton plant. The boll is then transported by an auger screw and pneumatic conveyor system to a receptacle mounted on top of the vehicle frame.

Picker type cotton harvesters have a harvesting drum with two vertically mounted picker spindle rotors transversely separated by a fore-and-aft plant passage. Each picker spindle rotor has a plurality of picker bars with operative picker spindles. The picker spindles interact with the cotton plant to remove the cotton lint from the cotton boll. Each picker spindle rotor is provided with a doffer for removing the lint from the picker spindles. The lint is then transported by a pneumatic conveyor to a receptacle mounted on top of the frame of the cotton harvester.

In both picker and stripper type cotton harvesters deviation from standard operating rotational speed of the harvesting rotors is often an indication of harvesting unit malfunction or overload. In stripper type harvesters a retardation of the brush row rotational speed indicates a failure in the drive system, or a choked condition. In picker type cotton harvesters the rotor speed will be retarded when there is an overload. Also, picker type cotton harvester's rotor speed will become uncharacteristically high when a drive chain has failed.

McBee U.S. Pat. No. 4,282,702 provides a monitor for detecting an overload condition on the picker drum of a cotton harvesting unit. McBee provides a leaf spring contact supported above a slip clutch having a driven portion meshing with a driving pinion. An overload condition forces the driven portion upward against the contact, shorting the contact to a unit frame which causes the overload indicator lamp on the operator's panel to light.

McBee can only be used on harvester rotors utilizing a slip clutch. McBee can monitor an overload condition but is not suitable for use for detection of overspeed conditions. McBee is most suitable for conditions where the malfunction causes a torque overload of the harvesting rotor.

Hubbard et al. U.S. Pat. No. 4,306,403 provides an overload sensor for a cotton harvester unit drive. Normal tension in the belt drive to the harvesting unit input shaft is balanced by an adjustable spring load. Overload of the input shaft overcomes the spring load to activate an electrical switch that alerts the operator by lighting a warning lamp. The input drive includes a slip clutch, and the spring load is adjusted so that a warning is provided before the drive load reaches the loading which would cause the clutch to begin to slip. Hubbard et al. like McBee senses overload conditions. It is not suitable to monitor harvesting rotor malfunctions which do not manifest themselves by increases in the torque requirement of the rotor.

Prior to the present invention it had been known to monitor the individual speed of a rotor. However, prior monitoring systems which monitor individual rotor speed only have a tendency to issue false alarms when the rotor slows down after completion of the harvesting operation on a plant row.

SUMMARY OF THE INVENTION

To overcome the disadvantages of prior overload sensors for cotton harvester harvesting unit rotors and drives, and prior rotational rotor speed monitors, the present invention is brought forth. The present invention provides a rotational speed monitoring system and method which individually monitors the separate speeds of a plurality of harvesting rotors. The rotational speeds of the total rotors is combined and then an average is computed. The individual harvesting rotor speed of each rotor is then compared with the average rotational speed of the combined rotors. If a rotor's rotational speed differs from the average rotational speed of the combined rotor by a predetermined differential, an alarm signal is activated.

It is a desire of the present invention to provide a cotton harvester harvesting rotor speed monitoring system. It is also a desire of the present invention to provide a cotton harvester harvesting rotor speed monitoring system which lowers the possibility of false alarms caused by the rotors slowing down after finishing the harvesting operation at the end of a plant row.

Other desires and advantages of the present invention will become apparent to those skilled in the art as the nature of the invention is better understood from the accompanying drawings and detail description.

BRIEF DESCRIPTION OF THE DRAWINGS

FIG. 3 is a top elevational view illustrating the drum on a four-row picker type cotton harvester.

DETAILED DESCRIPTION OF THE DRAWINGS

Figure 1:
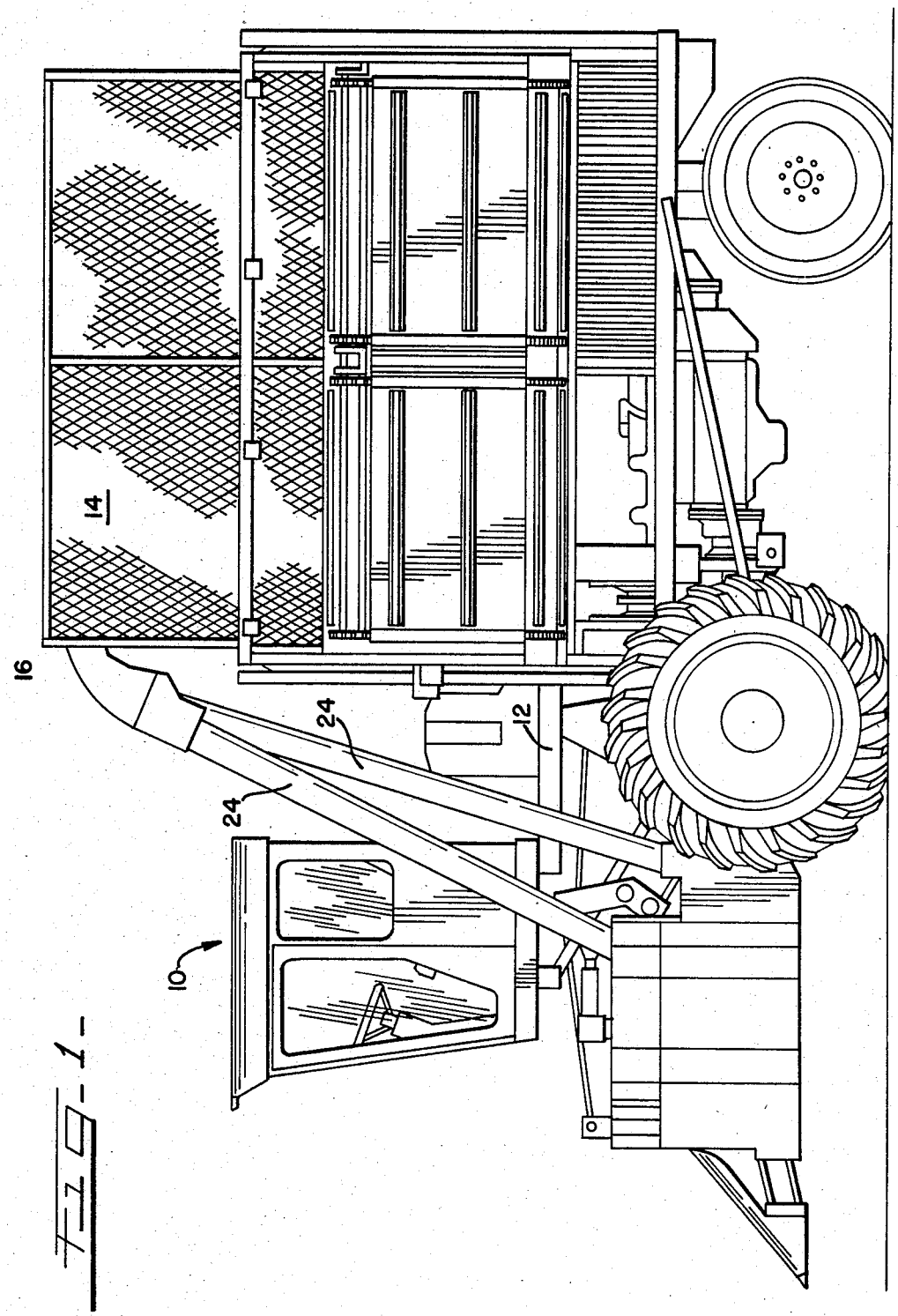
FIG. 1 is a side elevational view of the picker type cotton harvester.

Referring to FIGS. 1 and 3, a picker type cotton harvester 10 typically has a wheeled frame 12 with a receptacle, commonly referred to as a basket 14 mounted on top. Pivotally extending forwardly from the wheeled frame are the harvesting units, or drums 16, 18, 20 and 22. A series of pneumatic conveyors 24 transport the harvested lint cotton from the drums to the basket inlet 16.

Representative drum 16 has a pair of picker spindle rotors 28 and 26 transversely separated by a fore-and-aft plant passage 30. Picker spindle rotors 28 and 26 have corresponding doffers 32 and 34 for removing the cotton from the picker spindles. The harvested cotton is then transported by the pneumatic conveyors 24 to the basket inlet 16.

To ensure that the drums are functioning properly, the rotational speeds of the spindle rotors are monitored. An overload condition on a given spindle rotor will usually manifest itself by a decrease in speed of that rotor. A failure in the drive chain of the drive system which powers the rotors will usually manifest itself in a rotor reaching excessive speeds.

Figure 2:
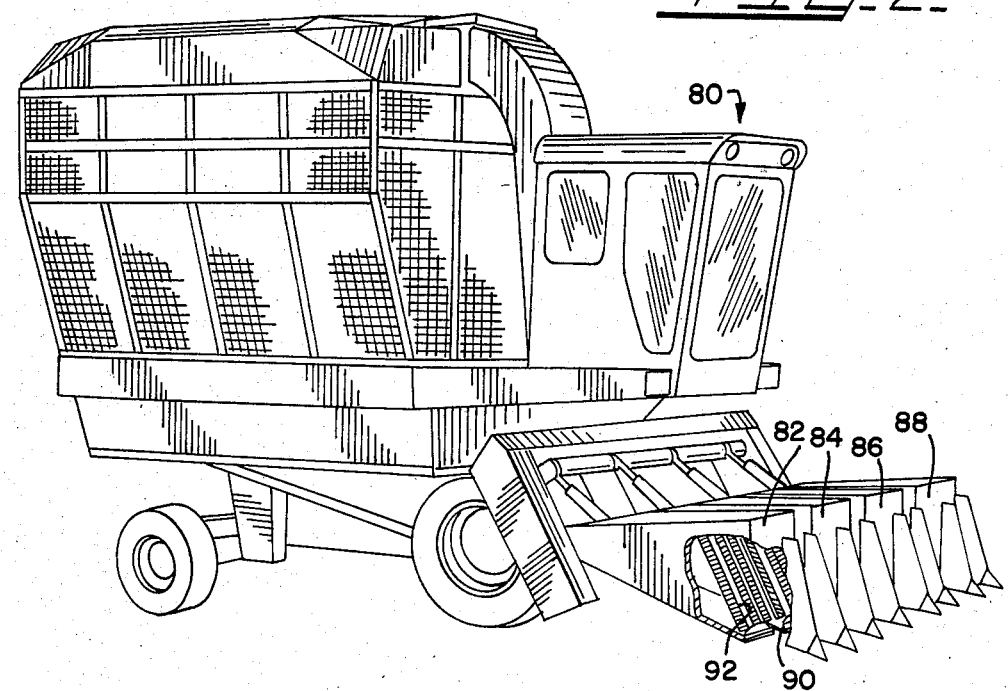
FIG. 2 is a perspective view of a stripper type cotton harvester.

The stripper cotton harvester 80 of FIG. 2 has substantial similarities with the picker type cotton harvester. However, the stripper cotton harvester 80 functions to remove the boll from the cotton plant instead of harvesting the lint from the boll as the picker cotton harvester does. Each of the harvesting units 82, 84, 86, and 88 of the stripper type cotton harvester has two parallel mounted rotating brush rollers 90 and 92. The brush rollers have alternating lengths of nylon bristles and rubber flaps. The nylon bristles and rubber flaps of the two rollers cooperate with one another to strip the cotton boll from the plant. The speed of rotation of the brush rolls is also monitored to indicate to the operator of the various malfunctions which may occur in the harvesting units.

Figure 4:
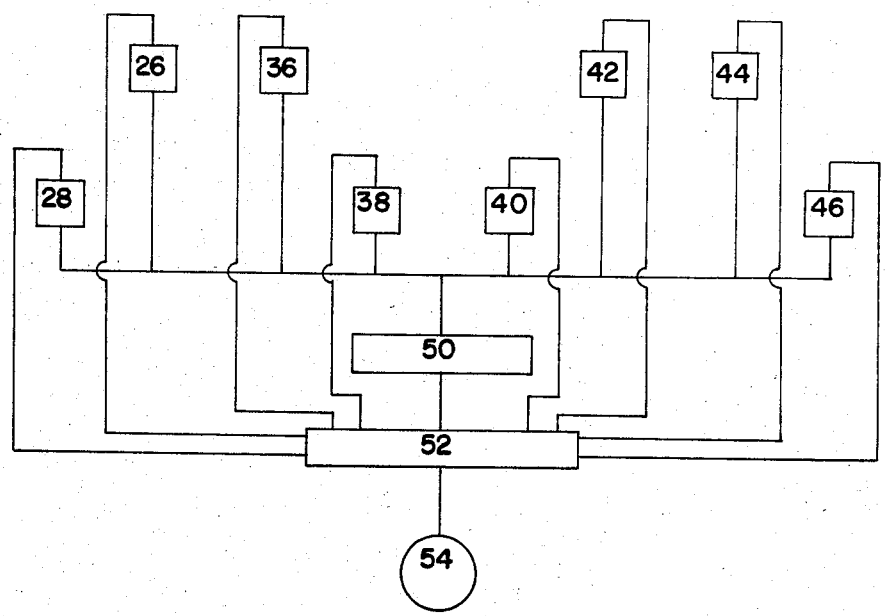
FIG. 4 is a schematic view of the cotton harvester harvesting rotor rotational speed monitoring system.

Referring to FIGS. 3 and 4, harvesting rotors 26, 28, 36, 38, 40, 42, 44, 46 have individual speed monitors. The output from each individual speed monitor is fed into the averaging processor 50. The averaging processor calculates the average rotational speed for all of the rotors. The average speed is fed to a comparison processor 52. The comparison processor compares the average rotational speed with the individual speed of each rotor. If the rotor speed of any individual rotor differs by a predetermined amount from the average speed, the alarm 54 is activated.

The differential speed which activates the alarm will be set by design criterion and typically can be in a range of plus 10% or minus 20%. Also, when a rotor speed slows to the alarm point and the alarm is triggered, that rotor speed is dropped from the averaging calculation so the average is not unduly distorted by the slow rotor.

By comparing the rotational speed of each individual rotor with the average rotational speed of the combined rotors, false alarms are eliminated when ending the harvesting operation.

The alarm mechanism may be further modified such that, the alarm mechanism is deactivated when the average rotational speed for the combined rotors is lower than a predetermined amount. By deactivating the alarm at low speed levels, false alarms are eliminated when initially activating the harvesting unit or disengaging operation of the harvesting unit.

Another modification for the alarm system is to use the frequency of the alarm system to inform the operator of which rotor is malfunctioning. The frequency change can be utilized with either audio or visual alarm signals. Typically, on a four-row harvesting machine four alarm lights (one for each harvesting unit) will be mounted within the cab. To differentiate between the front and rear rotors the flash rate of the signal light will be used. A high frequency (fast) flash rate may be used to indicate a malfunction in the front rotor. A low frequency (slow) flash may be used to indicate a malfunction in the rear rotor. If desired, one light may be used for both rotors and an audible signal with a short pause may indicate the front rotor and an audible signal with long pauses may indicate the rear rotor.

While a few embodiments of the present invention have been explained, it will be readily apparent to those skilled in the art of the various modifications which can be made to the present invention without departing from the spirit and scope of this application as encompassed by the following claims.

What is claimed is:

1. A cotton harvester with a plurality of harvesting rotors having a rotor speed monitoring system comprising:
   rotor revolutional speed counting means;
   averaging means to determine the average rotational speed of the combined rotors;
   alarm means activated by a predetermined differential rotational speed of a rotor from the average rotational speed of said combined rotors; and
   frequency signal means to indicate which rotor has a rotational speed which differs from the average rotation speed of the combined rotors by predetermined amount.
2. A cotton harvester as described in claim 1, wherein said frequency signal is audible.
3. A cotton harvester as described in claim 1 wherein said frequency signal is visual.

* * * * *